United States Patent
Ido et al.

(10) Patent No.: US 10,329,382 B2
(45) Date of Patent: Jun. 25, 2019

(54) ALKYLENE OXIDE POLYMER PRODUCTION METHOD

(71) Applicant: Sumitomo Seika Chemicals Co., Ltd., Hyogo (JP)

(72) Inventors: Toru Ido, Himeji (JP); Noboru Yamaguchi, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 16/036,580

(22) Filed: Jul. 16, 2018

(65) Prior Publication Data

US 2018/0319933 A1   Nov. 8, 2018

Related U.S. Application Data

(62) Division of application No. 15/129,248, filed as application No. PCT/JP2015/053777 on Feb. 12, 2015.

(30) Foreign Application Priority Data

Mar. 31, 2014   (JP) .................. 2014-072760

(51) Int. Cl.
   C08G 65/10   (2006.01)
   C08G 65/12   (2006.01)
   C08G 65/26   (2006.01)

(52) U.S. Cl.
   CPC .............. *C08G 65/12* (2013.01); *C08G 65/10* (2013.01); *C08G 65/266* (2013.01)

(58) Field of Classification Search
   CPC ...................................... C08G 65/12
   USPC ................. 528/422; 502/172, 162, 167, 168
   See application file for complete search history.

(56) References Cited

U.S. PATENT DOCUMENTS

| | | | |
|---|---|---|---|
| 5,326,852 A | 7/1994 | Fujikake et al. | |
| 2004/0087718 A1 | 5/2004 | Hamamoto | |
| 2014/0106171 A1 | 4/2014 | Kato et al. | |
| 2014/0120349 A1 | 5/2014 | Kato et al. | |

FOREIGN PATENT DOCUMENTS

| | | |
|---|---|---|
| EP | 0 239 973 A2 | 10/1987 |
| EP | 3 071 628 A1 | 9/2016 |
| JP | 45-007751 B | 3/1970 |
| JP | 53-027319 B | 8/1978 |
| JP | 62-232433 A | 10/1987 |
| JP | 05-017566 A | 1/1993 |
| WO | WO 2012/165199 A1 | 6/2012 |
| WO | WO 2012/165198 A1 | 12/2012 |

OTHER PUBLICATIONS

Extended European Search Report received in connection with European Patent Application No. 15772337.0 dated Oct. 9, 2017.
International Search Report received in connection with International Patent Application No. PCT/JP2015/053777 dated Apr. 14, 2015.

*Primary Examiner* — Shane Fang
(74) *Attorney, Agent, or Firm* — Knobbe, Martens, Olson & Bear, LLP

(57) ABSTRACT

Provided is a method to produce an alkylene oxide polymer having a high polymerization degree on an industrial scale and with high reproducibility. The method includes the step of carrying out a polymerization reaction of an alkylene oxide in an inert hydrocarbon solvent in the presence of a zinc catalyst to produce an alkylene oxide polymer. The zinc catalyst is produced by reaction of an organozinc compound with a monohydric alcohol in an amount of 12-fold equivalent or less relative to the amount of the organozinc compound and an aliphatic polyhydric alcohol in an amount of 0.2- to 1.1-fold equivalent relative to the amount of the organozinc compound. The polymerization reaction is carried out under such a condition that the amount of the monohydric alcohol in the polymerization reaction system becomes 0.01-fold equivalent or less relative to the amount of the organozinc compound.

6 Claims, No Drawings

ALKYLENE OXIDE POLYMER PRODUCTION METHOD

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

TECHNICAL FIELD

The present invention relates to a method for producing an alkylene oxide polymer. More particularly, it relates to a method for the production of an alkylene oxide polymer by which an alkylene oxide polymer having a high degree of polymerization can be produced industrially and reproducibly.

BACKGROUND ART

Conventionally, there are much studies regarding polymerization of an alkylene oxide, especially ethylene oxide, propylene oxide, etc. For example, it is known that a product prepared by reacting a monohydric alcohol further to a product obtained by reacting an organozinc compound to a polyhydric alcohol, or a product prepared by reacting a polyhydric alcohol further to a product obtained by reacting an organozinc compound to a monohydric alcohol (see, for example, Patent Documents 1 and 2) exhibits an excellent catalytic activity for homopolymerization of an alkylene oxide or copolymerization of two or more alkylene oxides and a polymer having a high degree of polymerization can be obtained.

However, there have been noted problems in that production stable on an industrial scale cannot be carried out by these methods, for example, reproducibility of polymerization speed or degree of polymerization of a resulting polymer is poor, resulting in failure to attain a sufficiently high yield, or a polymerized product agglomerates. Moreover, those methods are not fully satisfactory in degree of polymerization. On the other hand, there have been attempted methods of obtaining a polymer reproducibly by using a product prepared by reacting an organozinc compound and a polyhydric alcohol with each other (see, for example, Patent Document 3) as a catalyst in contact with various types of fine particulate metal oxide as a dispersion aid and a nonionic surfactant, but there has been noted a drawback that the operation of catalyst preparation is very complicated.

As a solution to the above-described problems, it is proposed, for example in Patent Document 4, to use as a polymerization catalyst a material prepared by heat-treating within a certain temperature range a product obtained by reacting an organozinc compound with an aliphatic polyhydric alcohol and a monohydric alcohol in a certain equivalent ratio.

PRIOR ART DOCUMENTS

Patent Documents

Patent Document 1: JP-B-45-7751
Patent Document 2: JP-B-53-27319
Patent Document 3: JP-A-62-232433
Patent Document 4: JP-A-5-17566

SUMMARY OF THE INVENTION

Problems to be Solved by the Invention

Through diligent effort, however, the present inventors have found that the reproducibility of a polymerization reaction may be deteriorated even if the method disclosed in Patent Document 4, for example, is used.

The present invention is an invention devised in view of such a problem. That is, a main object of the present invention is to provide a method for the production of an alkylene oxide polymer by which an alkylene oxide polymer having a high degree of polymerization can be produced industrially and reproducibly.

Means for Solving the Problem

The present inventors have researched earnestly in order to solve the above-mentioned problems. As a result, it has become apparent that despite performing the production of a catalyst under the same conditions using the method disclosed in Patent Document 4, if removal of unreacted monohydric alcohol by heat treatment is not attained uniformly, the catalytic activity may vary due to remaining monohydric alcohol and the polymerization time or the like may vary. Through further diligent effort, it has been found that an alkylene oxide polymer having a high degree of polymerization can be produced industrially and reproducibly by a method for the production of an alkylene oxide polymer including making an alkylene oxide undergo a polymerization reaction in the presence of a zinc catalyst in an inert hydrocarbon solvent to produce an alkylene oxide polymer, wherein the zinc catalyst is one prepared by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, and the polymerization reaction is performed under such conditions that the amount of the monohydric alcohol in a polymerization reaction system may be 0.01 equivalents or less relative to the organozinc compound. The present invention has been accomplished by further repeating studies based on these findings.

That is, the present invention provides inventions of the following aspects.

Item 1. A method for the production of an alkylene oxide polymer including making an alkylene oxide undergo a polymerization reaction in the presence of a zinc catalyst in an inert hydrocarbon solvent to produce an alkylene oxide polymer, wherein the zinc catalyst is one prepared by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, and the polymerization reaction is performed under such conditions that the amount of the monohydric alcohol in a system of the polymerization reaction may be 0.01 equivalents or less relative to the organozinc compound.

Item 2. A method for the production of an alkylene oxide polymer including making an alkylene oxide undergo a polymerization reaction in the presence of a zinc catalyst in an inert hydrocarbon solvent to produce an alkylene oxide polymer, wherein the method includes:

the step of reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound to prepare a reaction liquid, the step of distilling the reaction liquid under normal pressure at a temperature of 100° C. or lower to prepare a zinc catalyst in which the amount of the monohydric alcohol is adjusted to 0.01 equivalents or less relative to the organozinc compound, and the step of making the alkylene oxide undergo a polymerization reaction using the zinc catalyst in which the amount of the monohydric alcohol has been adjusted to 0.01 equivalents or less relative to the organozinc compound.

Item 3. The method for the production of an alkylene oxide polymer according to Item 1 or 2, wherein the organozinc compound is a dialkylzinc.

Item 4. The method for the production of an alkylene oxide polymer according to any one of Items 1 to 3, wherein the monohydric alcohol is an aliphatic alcohol having 1 to 3 carbon atoms.

Item 5. The method for the production of an alkylene oxide polymer according to any one of Items 1 to 4, wherein the aliphatic polyhydric alcohol is an aliphatic polyhydric alcohol having 2 or more carbon atoms and having two or more hydroxy groups in each molecule thereof.

Item 6. A method for the production of a zinc catalyst to be used for a polymerization reaction of an alkylene oxide, the method including:

the reaction step of reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, and the step of distilling the reaction liquid obtained in the reaction step under normal pressure at a temperature of 100° C. or lower to adjust the amount of the monohydric alcohol to 0.01 equivalents or less relative to the organozinc compound.

Item 7. A zinc catalyst to be used for a polymerization reaction of an alkylene oxide, prepared by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, then distilling the resulting reaction liquid under normal pressure at a temperature of 100° C. or lower, thereby having adjusted the amount of the monohydric alcohol to 0.01 equivalents or less relative to the organozinc compound.

Advantages of the Invention

According to the method for the production of an alkylene oxide polymer of the present invention, an alkylene oxide polymer having a high degree of polymerization can be produced industrially and reproducibly.

DETAILED DESCRIPTION OF THE PREFERRED EMBODIMENT

1. Method for the Production of an Alkylene Oxide Polymer

The method for the production of an alkylene oxide polymer of the present invention is a method for the production of an alkylene oxide polymer including making an alkylene oxide undergo a polymerization reaction in the presence of a zinc catalyst in an inert hydrocarbon solvent to produce an alkylene oxide polymer, characterized in that the zinc catalyst is one prepared by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, and the polymerization reaction is performed under such conditions that the amount of the monohydric alcohol in a polymerization reaction system may be 0.01 equivalents or less relative to the organozinc compound. Hereafter, the method for the production of an alkylene oxide polymer of the present invention is described in detail.

In the method for the production of an alkylene oxide polymer of the present invention, the alkylene oxide to be subjected to a polymerization reaction as a raw material is not particularly limited, and examples thereof include ethylene oxide, propylene oxide, butylene oxide, cyclohexene oxide, styrene oxide, and epichlorohydrin. Of these alkylene oxides, ethylene oxide, propylene oxide, etc. are preferably used in terms of high solubility of a resulting alkylene oxide polymer in water. These alkylene oxides may be used individually or two or more of them may be used in combination. A polymer prepared using an alkylene oxide singly is a homopolymer of the alkylene oxide, and a polymer prepared using two or more alkylene oxides in combination is a copolymer of these alkylene oxides. The alkylene oxide polymer to be produced by the production method of the present invention may be either a block copolymer or a random copolymer.

The inert hydrocarbon solvent to be subjected to the polymerization reaction is not particularly limited, and preferable examples thereof include aliphatic hydrocarbons, such as n-pentane, n-hexane, n-heptane, and cyclohexane; and aromatic hydrocarbons, such as benzene, toluene, and xylene. Of these solvents, n-hexane, n-heptane, and the like are preferably used because they are easily available in the industry. These solvents may be used individually or two or more of them may be used in combination.

While the amount of the inert hydrocarbon solvent to be used in the polymerization reaction is not particularly limited, it is preferably 200 to 10000 parts by mass, more preferably 300 to 1000 parts by mass, even more preferably 400 to 600 parts by mass, relative to 100 parts by mass of the alkylene oxide from the viewpoint of advancing the polymerization reaction efficiently and the viewpoint of inhibiting a product alkylene oxide polymer from forming a mass.

The zinc catalyst to be used for a polymerization reaction in the present invention is one obtained by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound. As described below, in the present invention, a zinc catalyst in which the amount of the monohydric alcohol has been adjusted to 0.01 equivalents or less relative to the organozinc compound can be obtained by preparing such a reaction liquid and then distilling the reaction liquid under normal pressure at a temperature of 100° C. or lower, thereby evaporating unreacted monohydric alcohol, and the product can be used for a polymerization reaction by the zinc catalyst. At this time, the amount of the monohydric alcohol in the polymerization reaction system is 0.01 equivalents or less relative to the organozinc compound. In the present invention, performing a polymerization reaction under such conditions makes it possible to produce an alkylene oxide polymer having a high degree of polymerization industrially and reproducibly.

The organozinc compound to be used for the preparation of the zinc catalyst is a compound denoted by the formula:

ZnR$_2$. In the formula, R each independently may be an alkyl group having 1 to 6 carbon atoms, a phenyl group, a cycloalkyl group having 4 to 6 carbon atoms, or the like. Specific examples of the organozinc compound include dialkylzinc, such as dimethylzinc, diethylzinc, di-n-propylzinc, and dibutylzinc; diphenylzinc, and dicyclobutylzinc. Of these, a dialkylzinc is preferred, and diethylzinc is particularly preferred.

The monohydric alcohol to be used for the preparation of the zinc catalyst is an alcohol having one hydroxy group in each molecule thereof and having no other active hydrogen. Specific examples of the monohydric alcohol include primary alcohols such as methanol, ethanol, 1-propanol, and 1-butanol; secondary alcohol such as 2-propanol and 2-butanol; and tertiary alcohol such as tert-butanol. Of these, a monohydric alcohol having 1 to 3 carbon atoms and having a boiling point under normal pressure of 100° C. or lower is preferred because it is necessary to efficiently remove unreacted monohydric alcohol to the outside of the system during the distillation described below, and specifically, an aliphatic alcohol having 1 to 3 carbon atoms, such as methanol, ethanol and 2-propanol, is preferably used. These monohydric alcohols may be used individually or two or more of them may be used in combination.

In the preparation of the zinc catalyst, it is necessary to adjust the upper limit of the use amount of the monohydric alcohol to 12 equivalents or less relative to the organozinc compound from the viewpoint of removing unreacted monohydric alcohol by the distillation described below, thereby reproducibly performing a polymerization reaction under such conditions that the amount of unreacted monohydric alcohol may be 0.01 equivalents or less relative to the organozinc compound. The upper limit of the use amount of the monohydric alcohol is preferably 10 equivalents or less, more preferably 8 equivalents or less. From the viewpoint of maintaining the activity of the zinc catalyst obtained, the lower limit of the use amount of the monohydric alcohol is preferably 1 equivalent or more, more preferably 2 equivalents or more, even more preferably 3 equivalents or more, relative to the organozinc compound. A preferable range of the use amount of the monohydric alcohol is preferably 1 to 12 equivalents, more preferably 2 to 10 equivalents, even more preferably 3 to 8 equivalents, relative to the organozinc compound.

The aliphatic polyhydric alcohol to be used for the preparation of the zinc catalyst is an aliphatic polyhydric alcohol having 2 or more carbon atoms and having 2 or more hydroxy groups in each molecule thereof. Specific examples of the aliphatic polyhydric alcohol include ethylene glycol, propylene glycol, 1,2-butanediol, 1,3-butanediol, 1,4-butanediol, 2,3-butanediol, 1,5-pentanediol, 2,3,4-pentanetriol, 1,6-hexanediol, glycerol, and pentaerythritol. Of these, aliphatic polyhydric alcohols having 4 carbon atoms are preferable from the viewpoint of the activity of a zinc catalyst to be obtained, and specifically, 1,3-butanediol and 1,4-butanediol are suitably used.

The upper limit of the use amount of the aliphatic polyhydric alcohol is required to be 0.2 to 1.1 equivalents relative to the organozinc compound from the viewpoint of preventing the formation of a mass of an alkylene oxide polymer in the production of an alkylene oxide polymer using the resulting zinc catalyst. A preferable range of the use amount of the aliphatic polyhydric alcohol may be 0.3 to 1.0 equivalent relative to the organozinc compound.

In the preparation of the zinc catalyst, it is preferable to use a reaction solvent in reacting the organozinc compound, the monohydric alcohol, and the aliphatic polyhydric alcohol together from the viewpoint of performing the reaction smoothly. The reaction solvent is not particularly limited and examples thereof include aliphatic hydrocarbons such as n-pentane, n-hexane, n-heptane, and cyclohexane; and aromatic hydrocarbons such as benzene, toluene and xylene. In the above-mentioned polymerization reaction, it is preferable to use the same solvent as the solvent to be used for the preparation of the zinc catalyst and the inert hydrocarbon solvent to be used for the polymerization reaction of the alkylene oxide, from the viewpoint of producing the alkylene oxide polymer efficiently.

In the preparation of the zinc catalyst, the use amount of the solvent may be preferably 200 to 1500 parts by mass, more preferably 300 to 1200 parts by mass, even more preferably 400 to 1000 parts by mass relative to 100 parts by mass of the organozinc compound from an economical point of view and the viewpoint of controlling heat of reaction.

When reacting the organozinc compound, the monohydric alcohol, and the aliphatic polyhydric alcohol together in the preparation of the zinc catalyst, it is preferable to perform the reaction in an inert gas atmosphere, such as nitrogen, argon, and helium, from the viewpoint of holding the activity of a zinc catalyst to be obtained.

In the preparation of the zinc catalyst, the method of reacting the organozinc compound, the monohydric alcohol, and the aliphatic polyhydric alcohol together is not particularly limited, and examples thereof include (a) a method in which a solvent and the organozinc compound are charged, then reacted with part of the monohydric alcohol, and subsequently reacted with the remainder of the monohydric alcohol and the aliphatic polyhydric alcohol, (b) a method in which a solvent and the organozinc compound are charged, then reacted with part of the aliphatic polyhydric alcohol, and subsequently reacted with the monohydric alcohol and the remainder of the aliphatic polyhydric alcohol, and (c) a method in which a solvent and the organozinc compound are charged, and then the monohydric alcohol and the aliphatic polyhydric alcohol are reacted simultaneously.

In the above method (a), the amount of the part of the monohydric alcohol to be reacted first may be preferably 0.2 equivalents or more, more preferably 0.4 equivalents or more relative to the organozinc compound. In the above method (b), the amount of the part of the aliphatic polyhydric alcohol to be reacted first may be preferably 0.1 equivalents or more, more preferably 0.2 equivalents or more relative to the organozinc compound.

As described above, in the production method of the present invention, as a result of distilling the reaction liquid prepared by the method described above, under normal pressure at a temperature of 100° C. or lower, thereby removing the monohydric alcohol until the amount of the monohydric alcohol in the reaction liquid becomes 0.01 equivalents or less relative to the organozinc compound, there is obtained a zinc catalyst in which the amount of the monohydric alcohol has been adjusted to 0.01 equivalents or less relative to the organozinc compound. In the present invention, the use of such a zinc catalyst makes it possible to perform a polymerization reaction under such conditions that the amount of the monohydric alcohol in a polymerization reaction system is adjusted to 0.01 equivalents or less relative to the organozinc compound, and an alkylene oxide polymer having a high degree of polymerization can be produced industrially and reproducibly.

The upper limit of the temperature in distilling the reaction liquid is preferably 100° C. or lower under normal pressure in order to hold the number of active points of a zinc catalyst to be obtained and hold the activity thereof. The upper limit of the distillation temperature may more preferably be 90° C. On the other hand, the lower limit of the distillation temperature is preferably 70° C. from the viewpoint of fully removing unreacted monohydric alcohol and aliphatic polyhydric alcohol to the outside of the system to prevent deterioration and variation in the activity of a zinc catalyst. The range of the distillation temperature may preferably be 70° C. to 90° C. In the present invention, the distillation temperature is the temperature of a heating medium that is heating a reaction vessel.

The number of times of performing distillation is not particularly limited, and it may preferably be twice or more, more preferably three times or more from the viewpoint of fully removing unreacted monohydric alcohol and aliphatic polyhydric alcohol to the outside of the system to prevent deterioration and variation in the activity of a zinc catalyst. In the case of performing distillation twice or more, it is preferable to add a proper amount of a solvent to be used for the polymerization reaction before each of the second or later distillations. The addition amount of the solvent is not particularly limited, and it may preferably be 400 to 1000 parts by mass relative to 100 parts by mass of the organozinc compound from the purpose of the distillation and the economical point of view.

Moreover, in the present invention, the zinc catalyst may further be heat treated after performing the above-mentioned distillation. The upper limit of the heat treatment temperature may preferably be 200° C. or lower, more preferably 150° C. or lower from the viewpoint of holding the activity of a zinc catalyst to be obtained. The lower limit of the heat treatment temperature may preferably be 100° C. or higher, more preferably 120° C. or higher from the viewpoint of fully removing unreacted monohydric alcohol and aliphatic polyhydric alcohol to the outside of the system to prevent deterioration and variation in the activity of a zinc catalyst. The range of the heat treatment temperature may preferably be 100 to 200° C., more preferably 120 to 150° C. In the present invention, the heat treatment temperature is the temperature of a heating medium that is heating a reaction vessel.

The time necessary for the heat treatment varies depending on the heating temperature, and it is properly determined usually within a range of 5 to 180 minutes, preferably within a range of 10 to 60 minutes from the viewpoint of preventing deterioration in the activity of a zinc catalyst to be obtained and variation in the activity.

In the method for the production of an alkylene oxide polymer of the present invention, it is required that the amount of the monohydric alcohol in the polymerization reaction system be equal to or less than 0.01 equivalents relative to the above-described organozinc compound. That is, it is necessary to use for the polymerization reaction the zinc catalyst in which the amount of the monohydric alcohol is equal to or less than 0.01 equivalents relative to the organozinc compound. When the amount of the monohydric alcohol exceeds 0.01 equivalents relative to the organozinc compound, variation in the activity of the zinc catalyst results, leading to variation in the polymerization time of the alkylene oxide and variation in the performance (especially, viscosity) of an alkylene oxide to be obtained. The amount of the monohydric alcohol in the zinc catalyst is a value determined by the measuring method described below.

The zinc catalyst prepared as described above may be used for a polymerization reaction of an alkylene oxide as received and can be used by adjusting its concentration through the adjustment of the amount of a solvent. The adjustment of the concentration can be performed, for example, by removing or adding the solvent in the distillation described above or the like.

The method of making an alkylene oxide undergo a polymerization reaction in the presence of a zinc catalyst in an inert hydrocarbon solvent is not particularly limited, and it may be, for example, a method in which the inert hydrocarbon solvent and the zinc catalyst are added to a polymerization reaction vessel, the alkylene oxide is further added, and they are polymerized in an inert gas atmosphere. It is preferable to perform the polymerization reaction under stirring or shaking from the viewpoint of performing the polymerization reaction smoothly.

The amount of the zinc catalyst to be used in the polymerization reaction is not particularly limited, it may preferably be 0.01 to 1 mol %, more preferably 0.02 to 0.8 mol % based on the zinc atoms in the zinc catalyst relative to the number of moles of the alkylene oxide from the viewpoint of efficient advance of the polymerization reaction.

The temperature of the polymerization reaction can arbitrarily be set according to reaction conditions such as the type and the concentration of the alkylene oxide and the concentration of the zinc catalyst, and it is usually 5 to 100° C., preferably 20 to 50° C. The pressure in the polymerization reaction is not particularly limited, and it may, for example, be 0.0 MPa to 1.0 MPa, preferably 0.01 MPa to 0.5 MPa.

As to the endpoint of the polymerization reaction, for example, the time when the internal pressure in the polymerization system has come to no longer change continuously for 15 minutes can be regarded as the endpoint of the reaction. An alkylene oxide polymer is obtained by performing drying, etc. after the completion of the polymerization reaction. The thus-obtained alkylene oxide polymer is usually in the form of fine particulates which do not agglomerate, and an alkylene oxide polymer having a viscosity of 300 mPa·s or more as measured by the measurement method described below can be obtained reproducibly.

While the mechanism of it becoming possible to produce an alkylene oxide polymer having a high degree of polymerization industrially and reproducibly in the present invention by performing a polymerization reaction using the zinc catalyst prepared as described above under such conditions that the amount of a monohydric alcohol in the polymerization reaction system is adjusted to 0.01 equivalents or less relative to the organozinc compound is not clear in detail, the mechanism can, for example, be considered as follows: That is, generally, there can be considered a mechanism in which in polymerization of an alkylene oxide using an organozinc compound, alkylene oxide molecules coordinate to zinc and undergo ring-opening addition successively. It is expected that owing to the fact that the amount of unreacted monohydric alcohol remaining after the polymerization reaction is very small as in the present invention, the catalytic activity of the zinc catalyst is improved and stabilized and, as a result, an alkylene oxide polymer having a high degree of polymerization is produced reproducibly.

The alkylene oxide polymer to be produced by the production method of the present invention is a useful polymer to be used for a variety of applications. For example, an ethylene oxide polymer can be used as a useful, water-soluble polymer in various fields including a dispersing agent for paper making, a coagulant, a water-soluble film, a water-soluble fiber, a sizing agent for printing, and a plasticizer.

2. Zinc Catalyst

In the present invention, the production of an alkylene oxide polymer can be performed using the above-described zinc catalyst. The zinc catalyst is characterized in that by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, then distilling the resulting reaction liquid under normal pressure at a temperature of 100° C. or lower, the amount of the monohydric alcohol has been adjusted to 0.01 equivalents or less relative to the organozinc compound. The zinc catalyst can be produced via the following steps.

The reaction step of reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound to prepare a reaction liquid.

The step of distilling the reaction liquid obtained in the reaction step under normal pressure at a temperature of 100° C. or lower to prepare a zinc catalyst in which the amount of the monohydric alcohol is adjusted to 0.01 equivalents or less relative to the organozinc compound.

In the zinc catalyst of the present invention, the alkylene oxide to be used for polymerization, the organozinc compound, the monohydric alcohol, and the aliphatic polyhydric alcohol to be used for the production of the zinc catalyst, the reaction conditions, etc. are as described above.

By the use of the zinc catalyst of the present invention for a polymerization reaction of an alkylene oxide, an alkylene oxide polymer having a high degree of polymerization can be produced industrially and reproducibly.

EXAMPLES

The present invention is described below in detail by providing Examples and Comparative Examples. However, the present invention is not limited to the Examples.

[Evaluation Methods]

The performance of the alkylene oxide polymer obtained in each of the Examples and the Comparative Examples was measured and evaluated by the following methods. The results are shown in Table 1 and Table 2.

(1) Measurement of Viscosity

A 1-liter beaker was charged with 497.5 g of ion-exchanged water, and 2.5 g of an alkylene oxide polymer was charged thereinto under stirred with a flat board of 80 mm in width and 25 mm in length at a tip peripheral speed of 1.0 m/s, and the stirring was continued for 3 hours to prepare an aqueous solution. The resulting aqueous solution was immersed in a 25° C. thermostatic bath for 30 minutes or more, and the viscosity of the aqueous solution was determined with a B type rotary viscometer (a B-type viscometer manufactured by TOKIMEC INC., rotor number=2, rotation speed=12 rpm, 3 minutes, 25° C.).

If the viscosity is 300 mPa·s or more, the polymer can be judged to be an alkylene oxide polymer having a high degree of polymerization.

(2) Measurement of the Amount of Monohydric Alcohol

The amount of a monohydric alcohol was measured using a gas chromatography (GC-2014 manufactured by Shimadzu Corporation; hereinafter GC) under conditions including an injection temperature of 200° C., a column to be used being Thermon 1000 (length: 3 meters), a column temperature of 100° C., and a detector temperature of 200° C., and a concentration was calculated from a peak area. The amount of a monohydric alcohol was calculated from an analytical curve prepared beforehand.

Example 1-1

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc ($Et_2Zn$) were placed, and as a first step, a reaction was carried out while dropping 11.03 g (0.240 mol) of ethyl alcohol (EtOH) at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol (1,4-BDO) and 13.27 g (0.288 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After the three-time distillation, the residue was moved to a pressure-resistant vessel thoroughly replaced with nitrogen, and was subjected to heat treatment at an oil bath temperature of 130° C. for 15 minutes with the vessel stoppered. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0033 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 0.975 g (0.0004 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 81.0 g of polyethylene oxide.

The polymerization time was 6 hours and the yield was 100% by mass. The viscosity of a 0.5% by mass aqueous solution of the resulting polyethylene oxide was 855 mPa·s.

Example 1-2

A zinc catalyst was produced in analogy to Example 1-1, thereby obtaining 297 g of a zinc catalyst containing 1.8% by mass of zinc. When the n-hexane of the supernatant liquid of this zinc catalyst was measured by GC, the amount of ethanol was found to be 0.0038 equivalents relative to an organozinc compound.

81 g (1.84 mol) of ethylene oxide was polymerized using the zinc catalyst in analogy to Example 1-1 and, as a result, 79.5 g of polyethylene oxide was obtained.

The polymerization time was 6 hours and the yield was 98% by mass. The viscosity of a 0.5% by mass aqueous solution of the resulting polyethylene oxide was 825 mPa·s, and reproducibility was good.

Example 1-3

A zinc catalyst was produced in analogy to Example 1-1, thereby obtaining 297 g of a zinc catalyst containing 1.8% by mass of zinc. When the n-hexane of the supernatant liquid of this zinc catalyst was measured by GC, the amount of ethyl alcohol was found to be 0.0047 equivalents relative to an organozinc compound.

81 g (1.84 mol) of ethylene oxide was polymerized using the zinc catalyst in analogy to Example 1-1 and, as a result, 80.7 g of polyethylene oxide was obtained.

The polymerization time was 6 hours and 45 minutes and the yield was 100% by mass. The viscosity of a 0.5% by mass aqueous solution of the resulting polyethylene oxide was 865 mPa·s, and reproducibility was good.

Example 2

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, a reaction was carried out while dropping 11.03 g (0.240 mol) of ethyl alcohol at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol and 13.27 g (0.288 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. After the two-times distillation, the residue was moved to a pressure-resistant vessel thoroughly replaced with nitrogen, and was subjected to heat treatment at an oil bath temperature of 130° C. for 15 minutes with the vessel stoppered. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0093 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 0.975 g (0.0004 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 78.6 g of polyethylene oxide.

The polymerization time was 6 hours and 45 minutes and the yield was 97% by mass. The viscosity of a 0.5% by mass aqueous solution of the resulting polyethylene oxide was 820 mPa·s.

Example 3

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, 1.47 g (0.030 mol) of ethyl alcohol was reacted while being dropped at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol and 13.27 g (0.288 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0013 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 3.38 g (0.0013 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 80.9 g of polyethylene oxide.

The polymerization time was 4 hours and 15 minutes and the yield was 100% by mass. The viscosity of a 0.5% by mass aqueous solution of the resulting polyethylene oxide was 810 mPa·s.

Example 4

A zinc catalyst was produced in analogy to Example 3 except that all the distillation temperatures where changed from 80° C. to 70° C. in the production of the zinc catalyst of Example 3, thereby obtaining 297 g of a zinc catalyst containing 1.8% by mass of zinc. When the n-hexane of the supernatant liquid of this zinc catalyst was measured by GC, the amount of ethyl alcohol was found to be 0.0058 equivalents relative to an organozinc compound.

81 g (1.84 mol) of ethylene oxide was polymerized using the zinc catalyst in analogy to Example 3 and, as a result, 77.9 g of an alkylene oxide polymer was obtained.

The polymerization time was 4 hours and 30 minutes and the yield was 96% by mass. The viscosity of a 0.5% by mass aqueous solution of the resulting polyethylene oxide was 595 mPa·s.

Example 5

A zinc catalyst was produced in analogy to Example 3 except that all the distillation temperatures where changed from 80° C. to 100° C. in the production of the zinc catalyst of Example 3, thereby obtaining 297 g of a zinc catalyst containing 1.8% by mass of zinc. When the n-hexane of the supernatant liquid of this zinc catalyst was measured by GC, the amount of ethyl alcohol was found to be 0.001 equivalents relative to an organozinc compound.

81 g (1.84 mol) of ethylene oxide was polymerized using the zinc catalyst in analogy to Example 3 and, as a result, 80.2 g of an alkylene oxide polymer was obtained.

The polymerization time was 5 hours and the yield was 99% by mass. The viscosity of a 0.5% by mass aqueous solution of the resulting polyethylene oxide was 720 mPa·s.

Example 6

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, 14.42 g (0.240 mol) of isopropyl alcohol (2-PrOH) was reacted while being dropped at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol and 17.31 g (0.288 mol) of isopropyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour.

Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After the three-times distillation, the residue was moved to a pressure-resistant vessel thoroughly replaced with nitrogen, and was subjected to heat treatment at an oil bath temperature of 130° C. for 15 minutes with the vessel stoppered. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of isopropyl alcohol was found to be 0.0001 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 0.975 g (0.0004 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 75.7 g of polyethylene oxide.

The polymerization time was 6 hours and 45 minutes and the yield was 93% by mass. The viscosity of a 0.5% by mass aqueous solution of the resulting polyethylene oxide was 575 mPa·s.

Example 7

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, 1.02 g (0.030 mol) of methyl alcohol was reacted while being dropped at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol and 9.22 g (0.288 mol) of methyl alcohol (MeOH) was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation.

Following the distillation, the residue was allowed to cool to room temperature and 52.4 g of n-hexane was added, and second distillation was carried out by heating at an oil bath temperature of 80° C. This operation was performed further once again and distillation was carried out three times in total. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of methyl alcohol was found to be 0.0008 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 3.38 g (0.0013 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 79.1 g of polyethylene oxide.

The polymerization time was 5 hours and 30 minutes and the yield was 98% by mass. The viscosity of a 0.5% by mass aqueous solution of the resulting polyethylene oxide was 425 mPa·s.

Example 8

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, a reaction was carried out while dropping 11.03 g (0.240 mol) of ethyl alcohol at a rate of 0.2 g/minute at an internal temperature of 20° C. under stirring at a tip peripheral speed of 0.97 m/second (the rotational speed of stirring=350 rpm). As a second step, a mixture liquid of 2.16 g (0.30 mol) of 1,4-butanediol and 26.54 g (0.576 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0048 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 3.38 g (0.0013 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 79.4 g of polyethylene oxide.

The polymerization time was 3 hours and the yield was 98% by mass. The viscosity of a 0.5% by mass aqueous solution of the resulting polyethylene oxide was 700 mPa·s.

Example 9

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and as a first step, 1.45 g (0.016 mol) of 1,4-butanediol was reacted while being dropped at a rate of 0.2 g/minute at an internal temperature of 20° C. under stirring at a tip peripheral speed of 0.97 m/second (the rotational speed of stirring=350 rpm). As a second step, a mixture liquid of 5.04 g (0.056 mol) of 1,4-butanediol and 24.3 g (0.528 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After the three-time distillation, the residue was moved to a pressure-resistant vessel thoroughly replaced with nitrogen, and was subjected to heat treatment at an oil bath temperature of 130° C. for 15 minutes with the vessel stoppered. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0007 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 3.38 g (0.0013 mol in terms of zinc) of the zinc catalyst obtained above was dispersed uniformly, and 81.0 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 80.8 g of polyethylene oxide.

The polymerization time was 4 hours and 30 minutes and the yield was 100% by mass. The viscosity of a 0.5% by mass aqueous solution of the resulting polyethylene oxide was 815 mPa·s.

Example 10

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 87.1 g of n-hexane and 9.90 g of diethyl zinc were placed, and a mixture liquid of 6.49 g (0.072 mol) of 1,4-butanediol and 24.3 g (0.528 mol) of ethyl alcohol was dropped at a rate of 0.2 g/minute at an internal temperature of 10° C. under stirring at a tip peripheral speed of 0.97 m/second (the rotational speed of stirring=350 rpm). After the completion of the dropping, the temperature of the inside of the flask was raised to 30° C. and a reaction was carried out for 1 hour, and subsequently the temperature was raised to 50° C. and the reaction was carried out for 1 hour. Then, heating was performed at an oil bath temperature of 80° C. and unreacted components were removed by distillation. Following the distillation, the residue was allowed to cool to room temperature and 52.4 g of n-hexane was added, and second distillation was carried out by heating at an oil bath temperature of 80° C. This operation was performed further once again and distillation was carried out three times in total. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0038 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 3.38 g (0.0013 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 76.3 g of polyethylene oxide.

The polymerization time was 7 hours and the yield was 94% by mass. The viscosity of a 0.5% by mass aqueous solution of the resulting polyethylene oxide was 530 mPa·s.

Comparative Examples 1-1

[Production of Zinc Catalyst]

There was prepared a round-bottomed flask of 80 mm in inner diameter and 500 mL in capacity equipped with a condenser, a dropping funnel, a nitrogen gas inlet tube, and stirring blades having four paddle blades (45 degrees inclined) having a blade diameter of 53 mm as a stirrer.

Into the flask replaced with nitrogen, 55.9 g of n-hexane, 21.2 g of high-boiling point aliphatic hydrocarbon (trade name: No. 0 Solvent produced by Nippon Oil Corporation) and 9.90 g of diethyl zinc were placed, and as a first step, a reaction was carried out while dropping 11.03 g (0.240 mol) of ethyl alcohol at a rate of 0.2 g/minute at an internal temperature of 20° C. under stirring at a tip peripheral speed of 0.97 m/second (the rotational speed of stirring=350 rpm). As a second step, a mixture liquid of 6.49 g (0.072 mol) of 1,4-butanediol and 13.27 g (0.288 mol) of ethyl alcohol was dropped at a rate of 0.2 g/minute to the reaction liquid cooled to an internal temperature of 10° C. After the completion of the dropping, the temperature of the inside of the flask was raised to 30° C. and a reaction was carried out for 1 hour, and subsequently the temperature was raised to 50° C. and the reaction was carried out for 1 hour. Then, heat treatment was carried out without stoppering at an oil bath temperature of 130° C. for 15 minutes. After cooling, the residue was diluted with 264 g of n-hexane, thereby obtaining 297 g of a zinc catalyst containing 1.8% by mass of zinc. When the n-hexane of the supernatant liquid of this zinc catalyst was measured by GC, the amount of ethyl alcohol was found to be 0.0116 equivalents relative to an organozinc compound.

[Production of Alkylene Oxide Polymer]

There was prepared a pressure-resistant reaction vessel of 94 mm in inner diameter and 1 L in capacity equipped with a dropping funnel, a nitrogen gas inlet tube, and stirring blades having an anchor-shaped paddle blades having a blade diameter of 47 mm as a stirrer.

A pressure-resistant vessel thoroughly replaced with nitrogen was charged with 340 g of n-hexane and 0.975 g (0.0004 mol in terms of zinc) of the zinc catalyst obtained above was dispersed uniformly, and 81 g (1.84 mol) of ethylene oxide was added and the vessel was stoppered, followed by polymerization under stirring in a thermostatic bath at 40° C. After the completion of the polymerization, a white product was taken out by filtration and dried at 40° C. under reduced pressure, thereby obtaining 80.2 g of polyethylene oxide.

The polymerization time was 7 hours and 30 minutes and the yield was 99% by mass. The viscosity of a 0.5% by mass aqueous solution of the resulting polyethylene oxide was 825 mPa·s.

Comparative Examples 1-2

A zinc catalyst was produced in analogy to Comparative Example 1-1, thereby obtaining 297 g of a zinc catalyst containing 1.8% by mass of zinc. When the n-hexane of the supernatant liquid of this zinc catalyst was measured by GC, the amount of ethyl alcohol was found to be 0.0334 equivalents relative to an organozinc compound.

81 g (1.84 mol) of ethylene oxide was polymerized using the zinc catalyst in analogy to Comparative Example 1-1 and, as a result, 79.8 g of polyethylene oxide was obtained.

The polymerization time was 11 hours and 15 minutes and the yield was 99% by mass. The viscosity of a 0.5% by mass aqueous solution of the resulting polyethylene oxide was 625 mPa·s.

Comparative Examples 1-3

A zinc catalyst was produced in analogy to Comparative Example 1-1, thereby obtaining 297 g of a zinc catalyst containing 1.8% by mass of zinc. When the n-hexane of the supernatant liquid of this zinc catalyst was measured by GC, the amount of ethyl alcohol was found to be 0.00221 equivalents relative to an organozinc compound.

81 g (1.84 mol) of ethylene oxide was polymerized using the zinc catalyst in analogy to Comparative Example 1-1 and, as a result, 78.3 g of polyethylene oxide was obtained.

The polymerization time was 9 hours and 45 minutes and the yield was 97% by mass. The viscosity of a 0.5% by mass aqueous solution of the resulting polyethylene oxide was 785 mPa·s.

necessary to remove a monohydric alcohol to a prescribed value or less by performing distillation before heat treatment of a zinc catalyst. It has also been confirmed that an alkylene oxide polymer having a high degree of polymerization can be produced industrially and efficiently also in Examples 2 to 10 by likewise adjusting that amount to 0.01 equivalents or less.

TABLE 1

| | Organozinc compound | | | Monohydric alcohol | | | | | | | | Polyhydric alcohol | | |
|---|---|---|---|---|---|---|---|---|---|---|---|---|---|---|
| | | | | First step | | | | Second step | | | Total | Second step | | |
| | | | | | | | [eq | | | [eq | [eq | | | [eq |
| | [-] | [g] | [mol] | [-] | [g] | [mol] | ratio] | [-] | [g] | [mmol] | ratio] | ratio] | [-] | [g] | [mmol] | ratio] |
| Example 1-1 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Example 1-2 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Example 1-3 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Example 2 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Example 3 | Et2Zn | 9.9 | 0.080 | EtOH | 1.47 | 0.030 | 0.4 | EtOH | 13.27 | 0.288 | 3.6 | 4.0 | 1,4-BDO | 6.49 | 0.072 | 0.90 |
| Example 4 | Et2Zn | 9.9 | 0.080 | EtOH | 1.47 | 0.030 | 0.4 | EtOH | 13.27 | 0.288 | 3.6 | 4.0 | 1,4-BDO | 6.49 | 0.072 | 0.90 |
| Example 5 | Et2Zn | 9.9 | 0.080 | EtOH | 1.47 | 0.030 | 0.4 | EtOH | 13.27 | 0.288 | 3.6 | 4.0 | 1,4-BDO | 6.49 | 0.072 | 0.90 |
| Example 6 | Et2Zn | 9.9 | 0.080 | 2-PrOH | 14.42 | 0.240 | 3.0 | 2-PrOH | 17.31 | 0.288 | 3.6 | 6.6 | 1,4-BDO | 6.49 | 0.072 | 0.90 |
| Example 7 | Et2Zn | 9.9 | 0.080 | MeOH | 1.02 | 0.030 | 0.4 | MeOH | 9.22 | 0.288 | 3.6 | 4.0 | 1,4-BDO | 6.49 | 0.072 | 0.90 |
| Example 8 | Et2Zn | 9.9 | 0.080 | EtOH | 11.03 | 0.240 | 3.0 | EtOH | 26.54 | 0.576 | 7.2 | 10.2 | 1,4-BDO | 2.16 | 0.024 | 0.30 |
| Example 9 | Et2Zn | 9.9 | 0.080 | 1,4-BDO* | 1.45 | 0.016 | 0.2 | EtOH | 24.3 | 0.528 | 6.6 | 6.6 | 1,4-BDO | 5.04 | 0.056 | 0.70 |
| Example 10 | Et2Zn | 9.9 | 0.080 | — | — | — | — | EtOH | 24.3 | 0.528 | 6.6 | 6.6 | 1,4-BDO | 6.49 | 0.072 | 0.90 |
| Comparative Example 1-1 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Comparative Example 1-2 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |
| Comparative Example 1-3 | Et2Zn | 9.9 | 0.080 | EtOH | 11.03 | 0.240 | 3.0 | EtOH | 13.27 | 0.288 | 3.6 | 6.6 | 1,4-BDO | 6.49 | 0.072 | 0.90 |

*1: In Table 1, 1,4-BDO is written in the column of monohydric alcohol for convenience thought it is not a monohydric alcohol.

TABLE 2

| | Distillation | | Heat treatment | | Residual monohydric alcohol | Amount of catalyst during polymerization | Polymerization time | Yield [% by mass] | Viscosity (0.5% by mass) |
|---|---|---|---|---|---|---|---|---|---|
| | [° C.] | Number of distillations | [° C.] | Time | [eq ratio] | [mol] | Time | mass] | [mPa · s] |
| Example 1-1 | 80 | 3 | 130 | 15 min | 0.0033 | 0.0004 | 6 hr | 100 | 855 |
| Example 1-2 | 80 | 3 | 130 | 15 min | 0.0038 | 0.0004 | 6 hr | 98 | 825 |
| Example 1-3 | 80 | 3 | 130 | 15 min | 0.0047 | 0.0004 | 6 hr 45 min | 100 | 865 |
| Example 2 | 80 | 2 | 130 | 15 min | 0.0093 | 0.0004 | 6 hr 45 min | 97 | 820 |
| Example 3 | 80 | 3 | — | — | 0.0013 | 0.0013 | 4 hr 15 min | 100 | 810 |
| Example 4 | 70 | 3 | — | — | 0.0058 | 0.0013 | 4 hr 30 min | 96 | 595 |
| Example 5 | 100 | 3 | — | — | 0.0010 | 0.0013 | 5 hr | 99 | 720 |
| Example 6 | 80 | 3 | 130 | 15 min | 0.0001 | 0.0004 | 6 hr 45 min | 93 | 575 |
| Example 7 | 80 | 3 | — | — | 0.0008 | 0.0013 | 5 hr 30 min | 98 | 425 |
| Example 8 | 80 | 3 | — | — | 0.0048 | 0.0013 | 3 Hr | 98 | 700 |
| Example 9 | 80 | 3 | 130 | 15 min | 0.0007 | 0.0013 | 4 hr 30 min | 100 | 815 |
| Example 10 | 80 | 3 | — | — | 0.0038 | 0.0013 | 7 Hr | 94 | 530 |
| Comparative Example 1-1 | — | — | 130 | 15 min | 0.0116 | 0.0004 | 7 hr 30 min | 99 | 825 |
| Comparative Example 1-2 | — | — | 130 | 15 min | 0.0334 | 0.0004 | 11 hr 15 min | 99 | 625 |
| Comparative Example 1-3 | — | — | 130 | 15 min | 0.0221 | 0.0004 | 9 hr 45 min | 97 | 785 |

As is apparent from the results shown in Tables 1 and 2, it is understood from the comparison of Examples 1-1, 1-2 and 1-3 with Comparative Examples 1-1, 1-2 and 1-3 that an alkylene oxide polymer can be obtained reproducibly by adjusting the amount of a monohydric alcohol in a zinc catalyst to 0.01 equivalents or less relative to an organozinc compound by performing distillation treatment during the production of the zinc catalyst. In other words, these results show that in order to reproducibly obtain an alkylene oxide polymer having a high degree of polymerization, it is

What is claimed is:

1. A method for the production of an alkylene oxide polymer comprising polymerizing an alkylene oxide in the presence of a zinc catalyst in an inert hydrocarbon solvent to produce an alkylene oxide polymer, wherein the method comprises:

(a) preparing a zinc catalyst by reacting an organozinc compound with a monohydric alcohol in an amount of 12 equivalents or less relative to the organozinc compound and an aliphatic polyhydric alcohol in an amount of 0.2 to 1.1 equivalents relative to the organozinc compound, (b) distilling the zinc catalyst obtained by step (a) at a temperature not exceeding 100° C. such that the amount of the monohydric alcohol in the polymerization reaction is 0.01 equivalents or less relative to the organozinc compound, and further heat treating the zinc catalyst under a heat treatment temperature from 100° C. to 130° C. after performing the distillation, and (c) polymerizing the alklyene oxide in the presence of the zinc catalyst in which the amount of the monohydric alcohol has been adjusted to 0.01 equivalents or less relative to the organozinc compound.

2. The method for the production of an alkylene oxide polymer according to claim 1, wherein the organozinc compound is a dialkylzinc.

3. The method for the production of an alkylene oxide polymer according to claim 1, wherein the monohydric alcohol is an aliphatic alcohol having 1 to 3 carbon atoms.

4. The method for the production of an alkylene oxide polymer according to claim 1, wherein the aliphatic polyhydric alcohol is an aliphatic polyhydric alcohol having 2 or more carbon atoms and having two or more hydroxy groups in each molecule thereof.

5. The method according to claim 1, wherein the product obtained in step (a) is distilled two or more times.

6. The method according to claim 1, wherein the range of the distillation temperature in step (b) is 70° C. to 90° C.

\* \* \* \* \*